United States Patent
Dyer et al.

(10) Patent No.: US 6,978,163 B2
(45) Date of Patent: Dec. 20, 2005

(54) MULTI-PURPOSE DONGLE FOR WIRELESS HEADSET

(75) Inventors: Medford Alan Dyer, San Diego, CA (US); James MacDonald Turnbull, San Diego, CA (US); Stuart Karten, Venice, CA (US); Eric Olson, Venice, CA (US)

(73) Assignee: Jabra Corporation, San Diego, CA (US)

( * ) Notice: Subject to any disclaimer, the term of this patent is extended or adjusted under 35 U.S.C. 154(b) by 234 days.

(21) Appl. No.: 10/095,153

(22) Filed: Mar. 11, 2002

(65) Prior Publication Data

US 2004/0198470 A1    Oct. 7, 2004

(51) Int. Cl.[7] ............................................. H04M 1/00
(52) U.S. Cl. ....................... 455/575.2; 455/569.1; 455/575.1; 455/572; 455/550.1; 455/573; 370/430; 370/428.02; 370/420.04
(58) Field of Search ........................... 455/569.1, 575.1, 455/575.2, 550.1, 572, 573; 379/430, 428.02, 379/420.04, 420, 446; 370/430, 428.02, 420.04

(56) References Cited

U.S. PATENT DOCUMENTS

| | | | | |
|---|---|---|---|---|
| 4,882,745 A | * | 11/1989 | Silver | 455/575.2 |
| 5,586,168 A | * | 12/1996 | Bucalo et al. | 455/575.1 |
| 5,590,417 A | * | 12/1996 | Rydbeck | 455/575.2 |
| 5,610,979 A | * | 3/1997 | Yu | 379/455 |
| 5,881,149 A | * | 3/1999 | Weatherill | 379/433.02 |
| 5,903,850 A | * | 5/1999 | Huttunen et al. | 455/557 |
| 6,078,825 A | * | 6/2000 | Hahn et al. | 455/569.2 |
| 6,299,041 B1 | * | 10/2001 | Pitisi et al. | 224/271 |
| 6,459,882 B1 | * | 10/2002 | Palermo et al. | 455/41.1 |
| 6,473,630 B1 | * | 10/2002 | Baranowski et al. | 455/572 |
| 6,636,749 B2 | * | 10/2003 | Holmes et al. | 455/569.2 |
| 6,763,111 B2 | * | 7/2004 | Liao | 379/446 |
| 6,892,051 B2 | * | 5/2005 | Schmitt et al. | 455/41.2 |
| 2004/0063456 A1 | * | 4/2004 | Griffin et al. | 455/550.1 |

* cited by examiner

Primary Examiner—Sonny Trinh
Assistant Examiner—Khai Nguyen
(74) Attorney, Agent, or Firm—Michael J. Bolan; Bingham McCutchen LLP

(57) ABSTRACT

Various devices are provided for conveniently storing, transporting and recharging wireless headsets and associated devices. According to some embodiments, a dongle is formed to receive a portion of a wireless headset, thereby bringing together electrical contacts of the dongle and electrical contacts of the wireless headset, thereby permitting convenient recharging of the wireless headset. In some embodiments, a dongle is integrated into a holster or carrying case for a wireless headset and/or an external device such as a telephone.

40 Claims, 9 Drawing Sheets

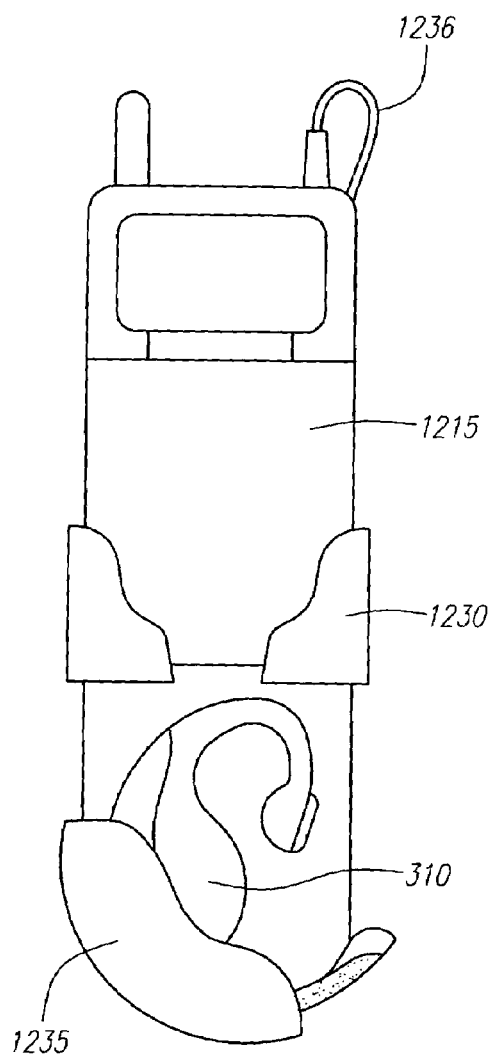
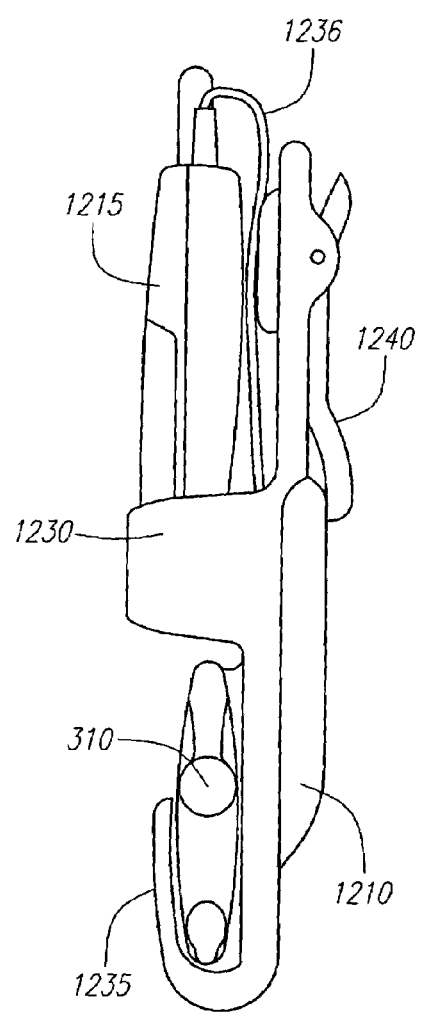
FIG. 13
FIG. 14

MULTI-PURPOSE DONGLE FOR WIRELESS HEADSET

FIELD OF THE INVENTION

The present invention relates to wireless communication systems and more particularly to wireless headsets.

BACKGROUND OF THE INVENTION

Wireless headsets have become increasingly popular in recent years. A wireless headset allows a user to keep both hands free and move about while remaining in communication with a telephone. For headsets which incorporate BLUETOOTH™ or similar technology, such as GN Netcom's GN 9000 series of wireless headsets, the wireless headset may communicate with a variety of external devices, such as telephones, computers, personal digital assistants, etc.

A wireless headset includes a battery, a microphone, a speaker and an inner transceiver. A wireless headset also requires a second, external transceiver, which has its own battery. This external transceiver, commonly known as a "dongle," replaces the wire which would otherwise connect the headset with an external device, (e.g., with a cellular telephone). The dongle receives headset signals from the wireless headset, typically in the form of RF signals, transforms the headset signals into a format used by the external device (if necessary) and transmits the transformed headset signals to the external device. Similarly, the dongle receives device signals from the external device, transforms the device signals into a format used by the headset (if necessary) and transmits the transformed device signals to the headset.

As shown in FIG. 1, prior art dongle 105 is connected by dongle cord 110 to external device 115, which is a cellular telephone in this example. External device 115 includes a battery (not shown) which must be frequently recharged by battery charger 118 via charger cord 119. Dongle 105 also includes a battery (not shown) which must be frequently recharged by battery charger 120 via charger cord 122. Wireless headset 125 also includes a battery (not shown) which must be frequently recharged by battery charger 130 via charger cord 132. Transporting the dongle, the dongle cord, the wireless headset, three battery chargers, multiple charger cords and the external device is awkward and cumbersome.

SUMMARY OF THE INVENTION

The present invention provides devices and methods for adding functionality to a dongle. In some embodiments of the present invention, a dongle is configured as a holster for holding a wireless headset. In some such embodiments, the dongle is configured to conduct an electrical current from a battery charger to the wireless headset. Some embodiments provide a dongle which is integrated with a battery charger configured to charge a battery in the dongle and a battery in the wireless headset. Some such holsters are configured to attach to an article of clothing, such as a belt.

In other embodiments of the present invention, the dongle is integrated into a carrying case, a holster or a similar carrying device. In some such embodiments, the carrying device is configured to carry an external device such as a wireless telephone. The carrying device preferably allows the dongle to be connected with the external device when the external device is in the carrying case. In some embodiments, the carrying device is configured to hold a wireless headset.

Some embodiments of the present invention include a dongle and a battery charger integrated in a carrying device for a wireless headset. In some such embodiments, the battery charger is configured to recharge a battery in the dongle and a battery in the wireless headset. In other embodiments, the carrying device is also configured to hold an external device and the battery charger is configured to recharge a battery in the dongle, a battery in the wireless headset and a battery in the external device.

Some embodiments of the present invention provide an apparatus for use with a wireless headset which includes a first battery and a first electrical contact coupled to the first battery. The apparatus includes: a housing having a recess configured to form an interference fit with a portion of the wireless headset; a transceiver disposed within the housing; a second battery disposed within the housing for supplying power to the transceiver; a recharger disposed within the housing for recharging the first battery and the second battery; a second electrical contact proximate the recess for coupling with the first electrical contact of the wireless headset when the recess forms an interference fit with the portion of the wireless headset; and a first cord for coupling the transceiver to an external device.

In some such embodiments, the transceiver incorporates BLUETOOTH™ technology. Some embodiments include a mounting device, for example, a clip configured to be attached to an article of clothing. These embodiments may be used with a variety of external devices, including but not limited to a telephone, a personal digital assistant, or a computer. Some embodiments include a device for retracting the first cord. Some embodiments include a second cord for supplying power to the recharger.

Other embodiments of the present invention provide a holster for use with a wireless headset which includes a first battery and a first electrical contact coupled to the battery. The holster includes: a housing; a transceiver disposed within the housing; a second battery disposed within the housing for supplying power to the transceiver; a cord for coupling the transceiver to an external device; a jack for making an electrical connection between the holster and a recharging device, thereby charging the second battery; a pocket for holding the wireless headset; and a second electrical contact proximate the pocket for transmitting current from the recharging device to the first electrical contact, thereby charging the first battery of the wireless headset when the pocket is holding the wireless headset such that the first electrical contact is touching the second electrical contact.

Some such embodiments include a device for retracting the cord. Some embodiments include a mounting device.

Still other embodiments of the present invention provide a carrying device for use with a wireless headset which includes a first battery and an external device which includes a second battery. The carrying device includes: a cover; a transceiver disposed within the cover; a third battery disposed within the cover for supplying power to the transceiver; a first compartment configured to receive the external device; a second compartment configured to receive the wireless headset; and a recharging device disposed within the cover for recharging the first battery, the second battery and the third battery.

In some such embodiments, the external device is a telephone. Some embodiments include a mounting device. Some embodiments include a jack for receiving power for the recharging device.

BRIEF DESCRIPTION OF THE DRAWINGS

FIG. 13 is a front view of the carrying device of FIG. 12.

FIG. 14 is a side view of the carrying device of FIGS. 12 and 13.

DESCRIPTION OF THE SPECIFIC EMBODIMENTS

The present invention addresses numerous shortcomings of the prior art methods and devices for using wireless headsets and associated gear. For example, the dongle has been re-invented as a device which not only functions as a transceiver but which also provides a variety of other functions. Some dongles according to the present invention are formed to hold a wireless headset. Some dongles are integrated with a battery charger which can charge the battery of the dongle, the wireless headset or other devices.

Some carrying cases of the present invention include a built-in dongle. Some carrying cases are designed to accommodate only a wireless headset, while others are designed to carry an external device and/or other gear.

Figure 1:
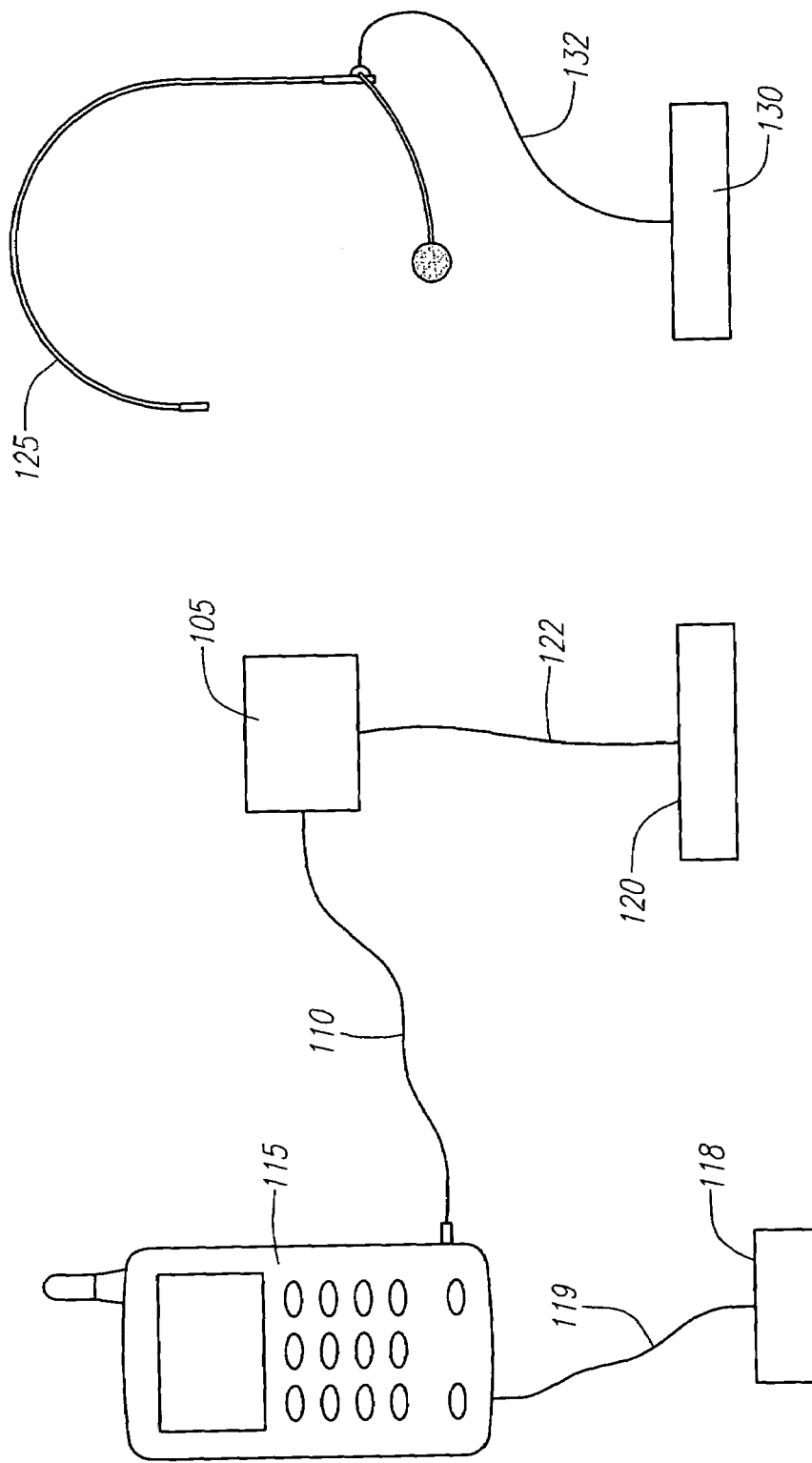
FIG. 1 illustrates a prior art dongle, a headset, an external device and associated charging devices.
Figure 2:
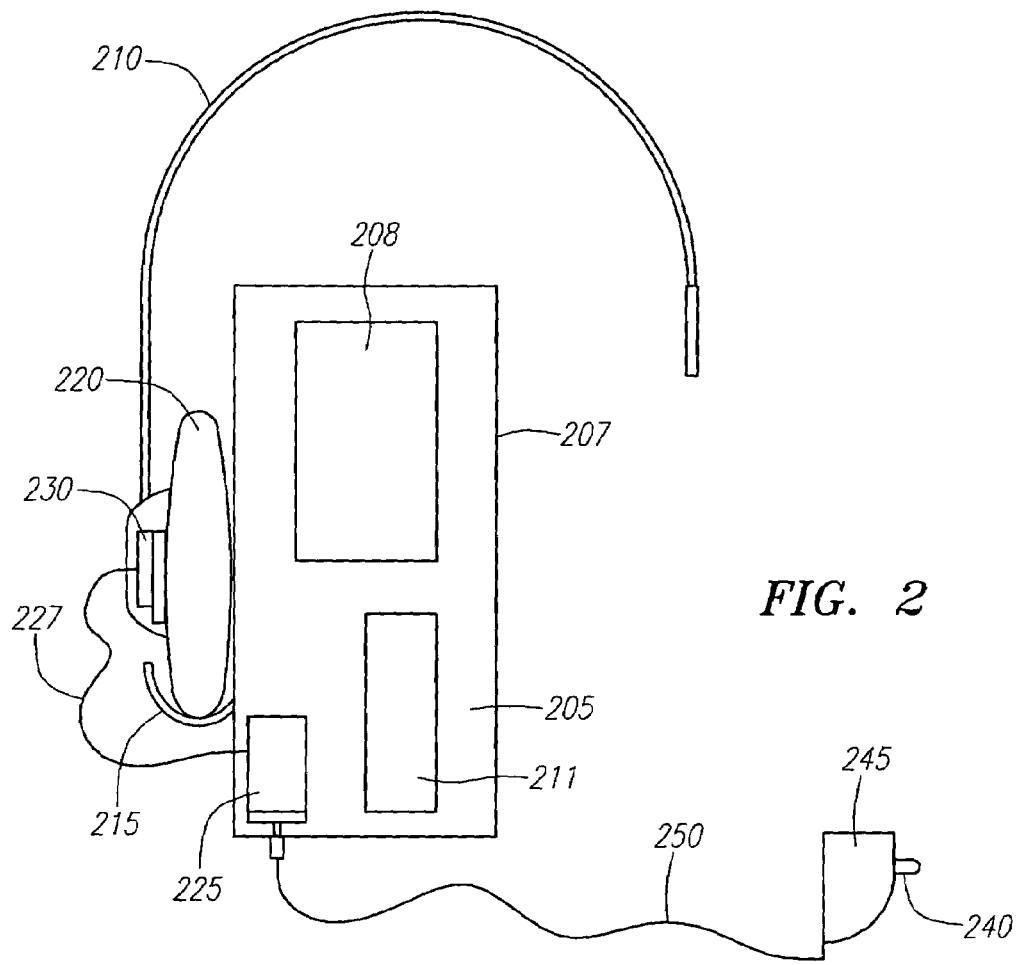
FIG. 2 illustrates a dongle integrated into a holster for a wireless headset according to one embodiment of the present invention.

FIG. 2 is a cut-away view of dongle 205 according to one embodiment of the present invention. Dongle 205 includes transceiver 208, battery 212 and battery charger 225. Cover 207 may be made of any suitable material, such as plastic, thermoplastic, metal, rubber, etc.

Dongle 205 is shown holding wireless headset 210, which includes battery 230. Sleeve 215 holds earpiece 220. Battery charger 225 supplies power to battery 230 through cord 227. Plug 240 is configured to fit into a standard electrical outlet. Transformer 245 transforms alternating current from the outlet to direct current, which is supplied to battery charger 225 via cord 250.

Figure 3:
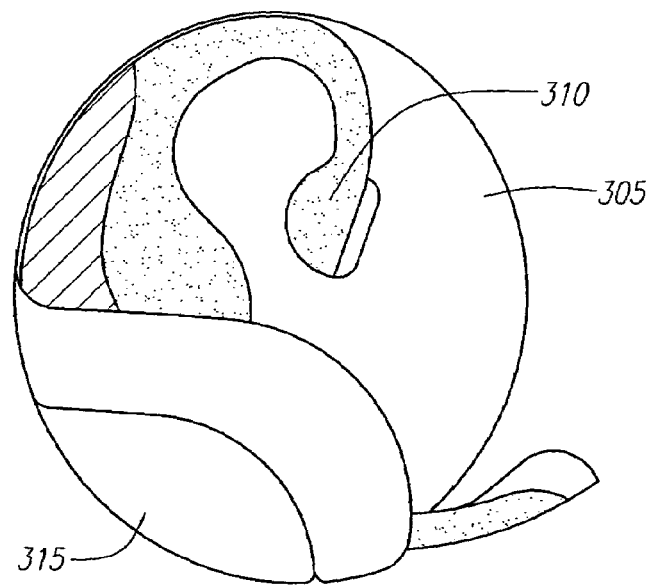
FIG. 3 shows a front view of a combination dongle and holster according to the present invention.

Other devices according to the present invention are designed to accommodate wireless headsets with shapes other than that of wireless headset 210. For example, in the embodiment of the present invention shown in FIG. 3, a dongle has been incorporated into holster 305, which is designed to fit wireless headset 310. Flap 315 holds wireless headset 310 in place for storage or transportation.

Figure 4:
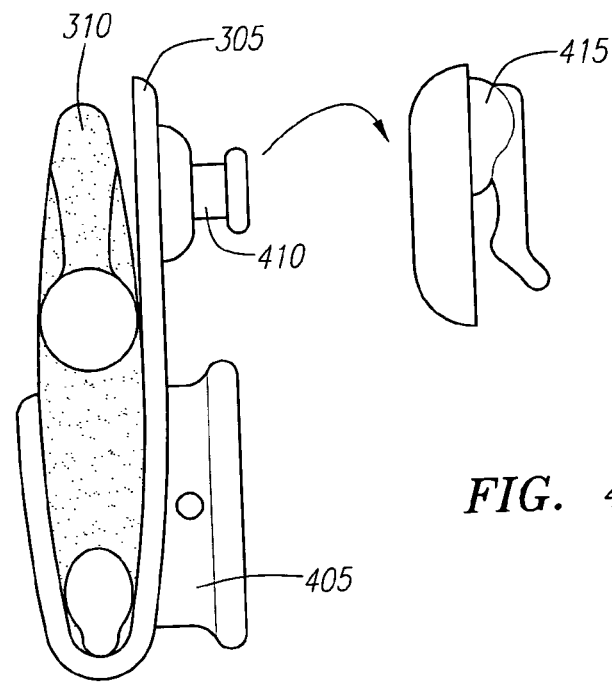
FIG. 4 indicates a side view of a combination dongle and holster.

FIG. 4 is a side view of holster 305 and headset 310, which shows integral dongle 405. This embodiment of holster 305 includes post 410 for coupling with clip 415, which is attachable to an article of clothing (e.g., a belt), to a dashboard, to an item on a user's desktop, etc. In other embodiments, an integral clip is used which combines the functions of post 410 and clip 415. In still other embodiments, an alternative mounting device replaces clip 415 or both clip 415 and post 410. Some such mounting devices include straps, VELCRO™ or similar fasteners, belts, adhesive material, suction cups and other devices for securing holster 305 to a variety of surfaces.

Figure 5:
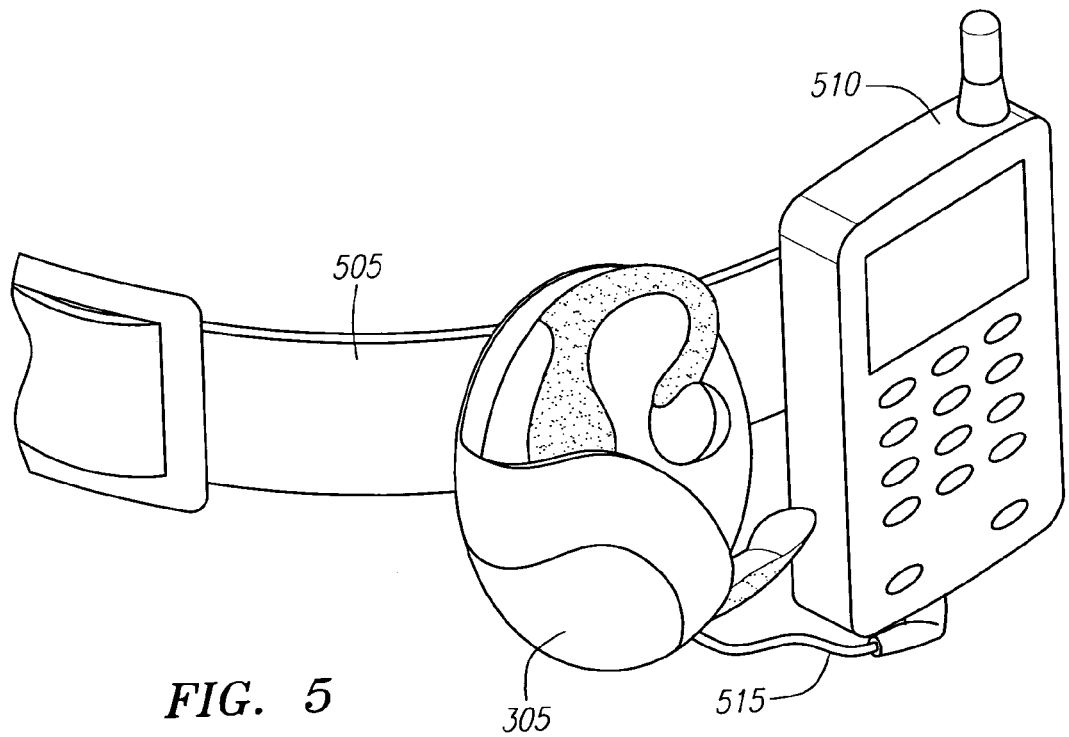
FIG. 5 shows the combination dongle and holster shown in FIG. 4 attached to a user's belt.

FIG. 5 indicates some of the advantages of the embodiment of holster 305 shown in FIG. 4. In FIG. 5, holster 305 is clipped to belt 505 next to external device 510, which is a telephone in this example. Cord 515 connects integral dongle 405 (not shown) to external device 510. In some embodiments, cord 515 is coiled and in some embodiments cord 515 is retractable. In some such embodiments holster 305 includes a retracting device (not shown) for retracting cord 515. In some such embodiments, the retracting device is a spring-loaded device.

In the prior art, the dongle would have added to the problem of cumbersome wireless headset gear. In this embodiment of the present invention, integral dongle 405 is formed as a part of holster 305 and becomes part of a solution for conveniently storing and transporting wireless headsets and associated gear.

Figure 6:
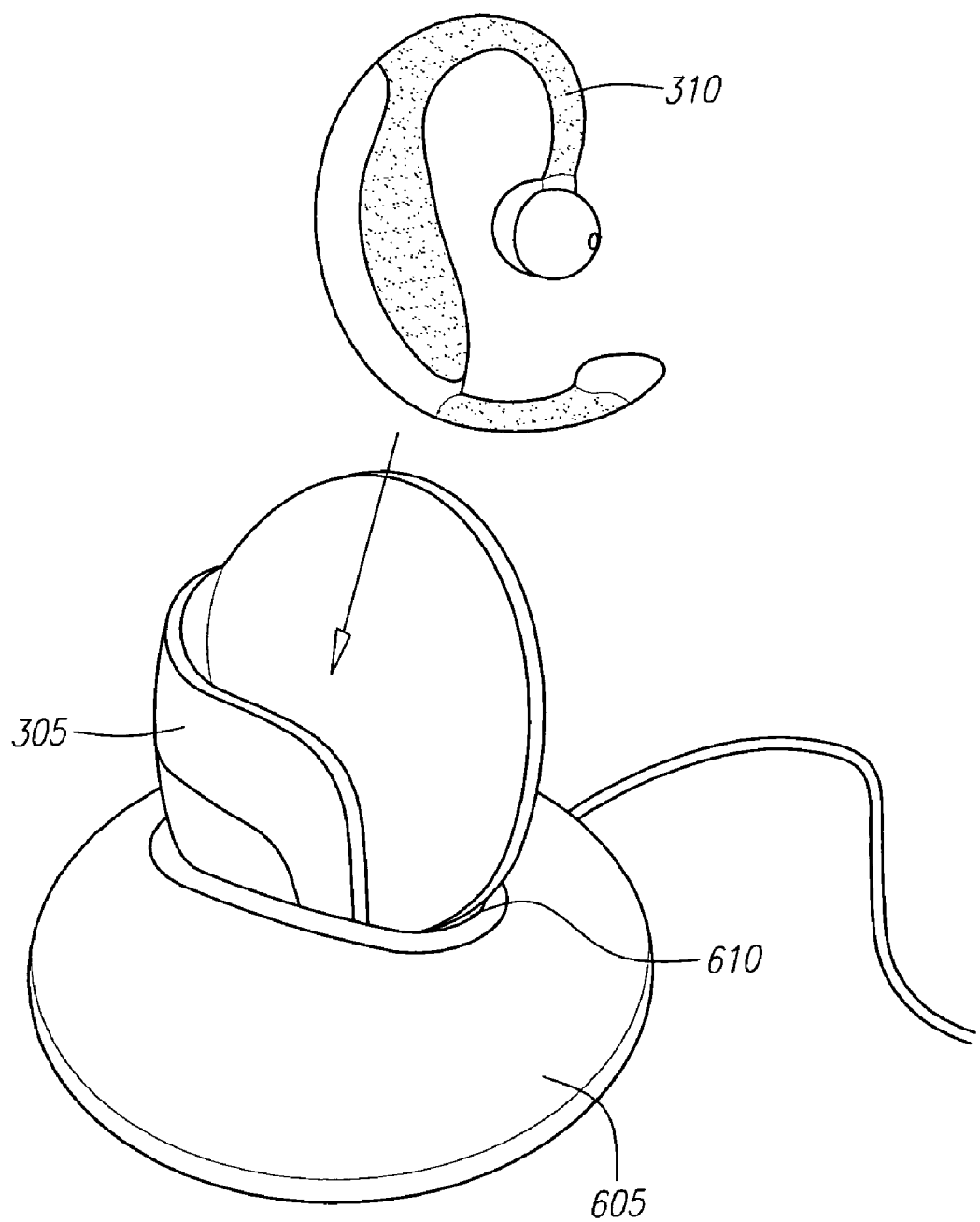
FIG. 6 illustrates a combination dongle and holster configured to allow both a dongle battery and a battery of a wireless headset to be recharged using the same recharger.

FIG. 6 illustrates how headset 310 may be recharged while inside of holster 305. Recharger 605 includes recess 610 for inserting holster 305. Holster 305 includes a jack (not shown) or a similar device for making an electrical connection with recharger 605. When wireless headset 310 is in holster 305 and holster 305 is inserted in recharger 605, the batteries in both wireless headset 310 and integral dongle 405 may be recharged. Other embodiments of recharger 605 include additional recesses, e.g., for charging an external device.

Figure 7:
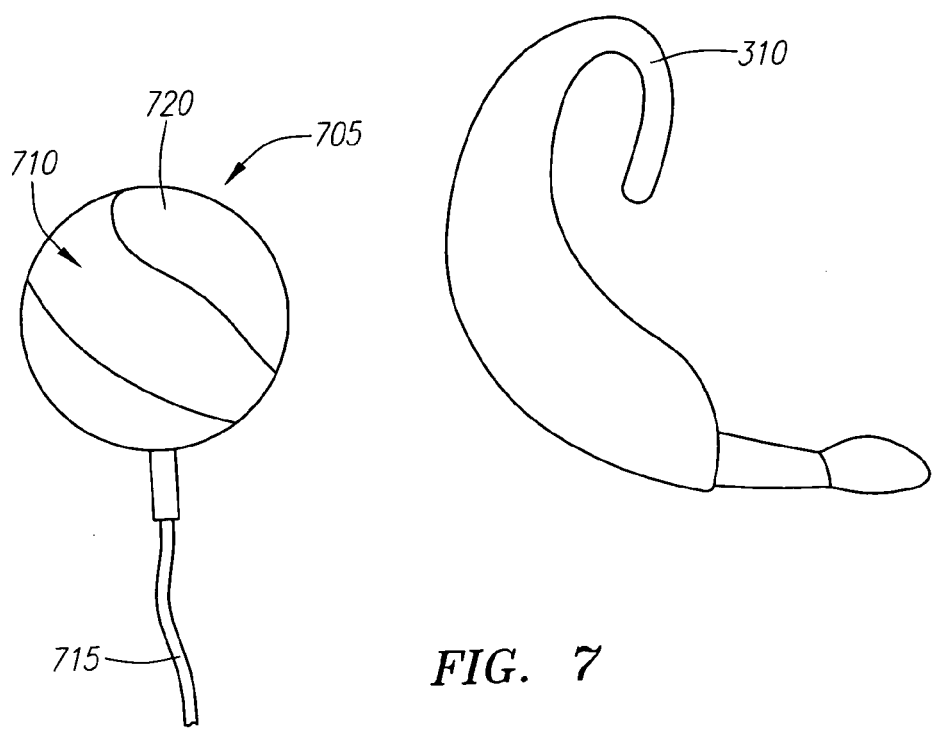
FIG. 7 illustrates a combination dongle and wireless headset holder with a wireless headset disengaged from the holder.

FIG. 7 illustrates wireless headset holder 705 with an integral dongle (not shown), a battery recharger (not shown) and an embodiment of wireless headset 310. One embodiment of wireless headset 310 is illustrated in the drawings of U.S. Design Pat. No. D469,081, which are hereby incorporated by reference. One embodiment of wireless headset holder 705 is illustrated in the drawings of U.S. Design Pat. No. D481,392, which are hereby incorporated by reference.

Cover 720 may be made of any suitable material, such as plastic, thermoplastic, metal, an elastomer, etc. Recess 710 of wireless headset holder 705 is configured to form an interference fit with at least a portion of wireless headset 310. Cord 715 couples to the external device (e.g., to a cellular telephone). These features will be discussed below with reference to FIGS. 8 and 9.

Like clip 415 and the alternative mounting devices discussed above with reference to FIG. 4, some embodiments of wireless headset holder 705 include a mounting device. Some such mounting devices are similar to clip 415 and are particularly suitable for attaching wireless headset holder 705 to an article of clothing, such as a belt. Other mounting devices include straps, VELCRO™ or similar fasteners, belts, adhesive material, suction cups or various other devices for securing wireless headset holder 705 to a desk, a computer, an automobile dashboard, a wall, or other surfaces.

Figure 8:
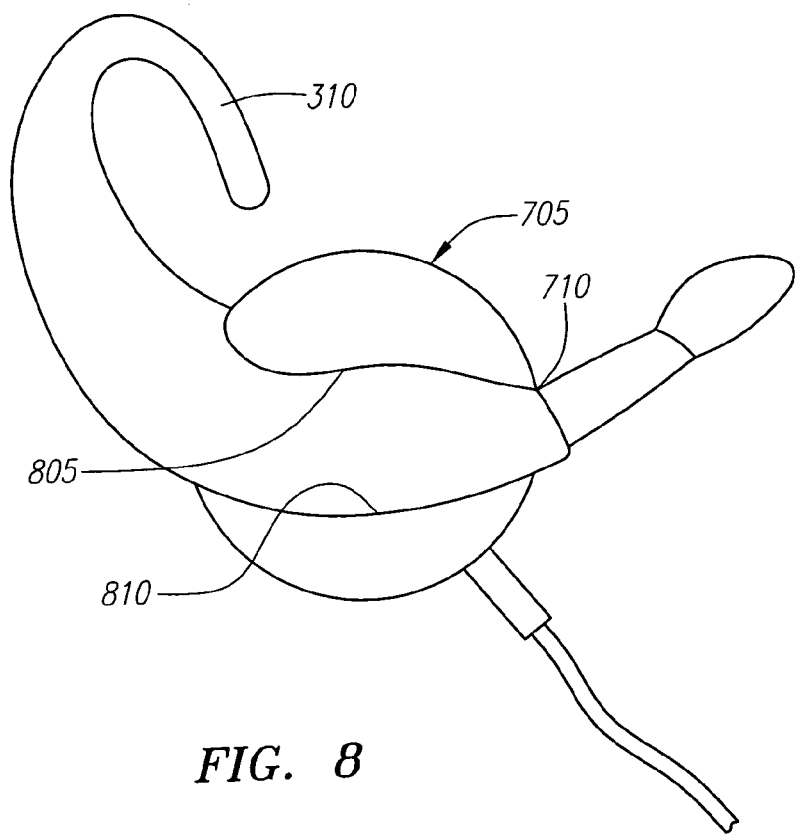
FIG. 8 illustrates a combination dongle and wireless headset holder holding a wireless headset.

FIG. 8 illustrates wireless headset 310 disposed within wireless headset holder 705. Side portions 805 and 810 of recess 710 form an interference fit with portions of wireless headset 310 and hold contacts (not shown) of wireless headset holder 705 and wireless headset 310 together while the battery of wireless headset 310 is charging.

Figure 9:
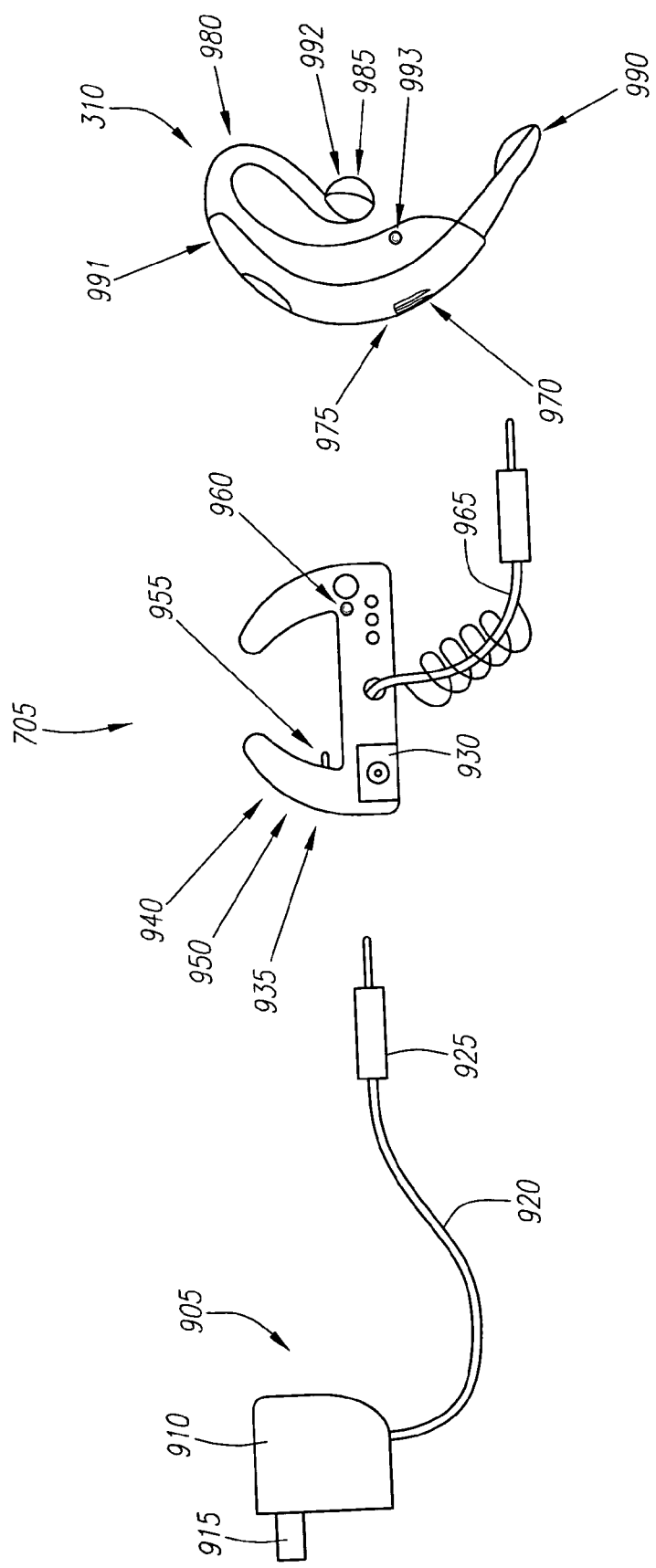
FIG. 9 is a schematic view of the combination dongle and holder shown in FIGS. 7 and 8.

FIG. 9 illustrates some of the components of wireless headset holder 705 and wireless headset 310 which are not visible in FIGS. 7 and 8. Adapter 905 includes prongs 915 for insertion into an electrical outlet, transformer 910 for converting alternating current to direct current and cord 920 for conducting the direct current to wireless headset holder 705: connector plug 925 fits into jack 930 to supply power to wireless headset holder 705. In some embodiments, cord 920 supplies power to battery chargers 940. Battery chargers 940 recharge battery 935. When contacts 970 are engaged with spring loaded pins 955, battery chargers 940 recharge battery 975 of wireless headset 310. In some embodiments, cord 920 (or another cord) supplies power directly to dongle 950.

In this embodiment, reset button 960 is recessed to avoid accidental resetting by a user. However, reset button 960 may have any convenient configuration.

Cord 965 connects dongle 950 to an external device such as a telephone. Cord 965 may be straight or coiled. Some embodiments of wireless headset holder 705 include a retracting device (not shown) for retracting cord 965. In some such embodiments, the retracting device is a spring-loaded device.

Wireless headset 310 includes radio 980 for transmitting signals to, and receiving signals from, a transceiver (not shown) in dongle 950. These radio signals are reproduced through speaker 985, which is enclosed in gel 992 in this embodiment for comfortable insertion into a user's ear. Microphone 990 picks up sound waves, including those corresponding to a user's voice, and transmits the resulting signals to dongle 950 via radio 980. Flexible portion 991 allows a comfortable fit to a user's ear. Reset button 993 is recessed in this embodiment.

Figure 10:
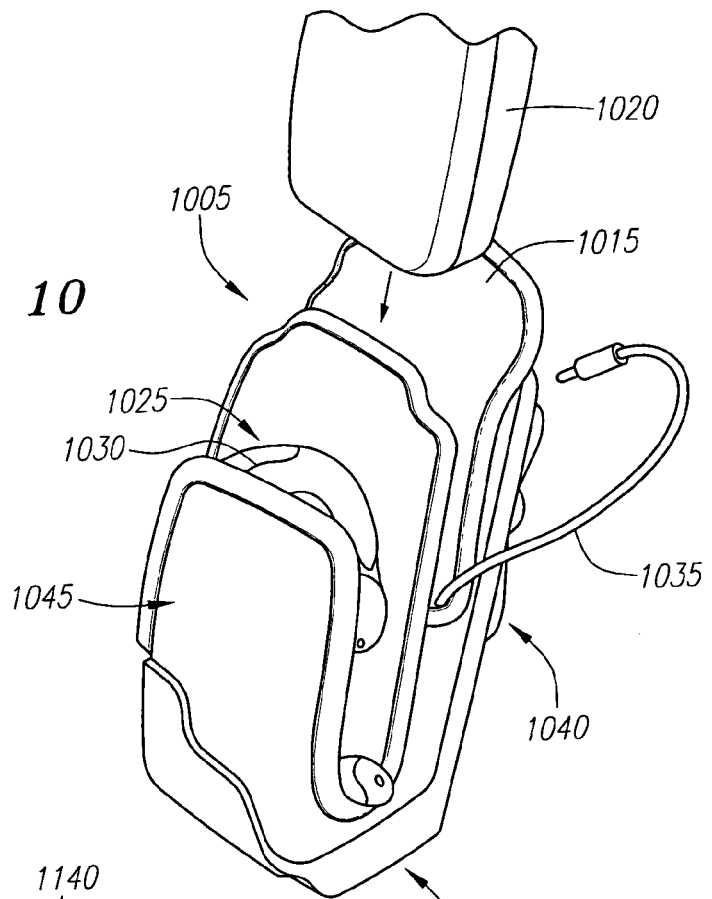
FIG. 10 shows a carrying case with an integral dongle for holding a wireless headset and an external device.

FIG. 10 illustrates one embodiment of a carrying case with an integrated dongle according to the present invention. Carrying case 1005 includes integrated dongle 1010. Pouch 1015 is configured to hold external device 1020, which is a telephone in this example. Pouch 1025 is designed to hold a wireless headset such as wireless headset 1030. Cord 1035 connects dongle 1010 with external device 1020. Clip 1040 allows carrying case 1005 to be attached to a user's belt.

Some embodiments of carrying case 1005 include an alternative mounting device. Some such mounting devices are similar to clip 1040 and are particularly suitable for attaching carrying case 1005 to an article of clothing. Other mounting devices include straps, VELCRO™ or similar fasteners, belts, adhesive material, suction cups or various other devices for securing carrying case 1005 to a desk, a computer, an automobile dashboard, a wall, or other surfaces.

Covering 1045 is preferably formed of a soft material such as leather, fabric, etc., or a semi-rigid material such as plastic. Jack 1050 receives power for a battery charger (not shown) for recharging the batteries of external device 1020, wireless headset 1030 and/or dongle 1010.

Figure 11:
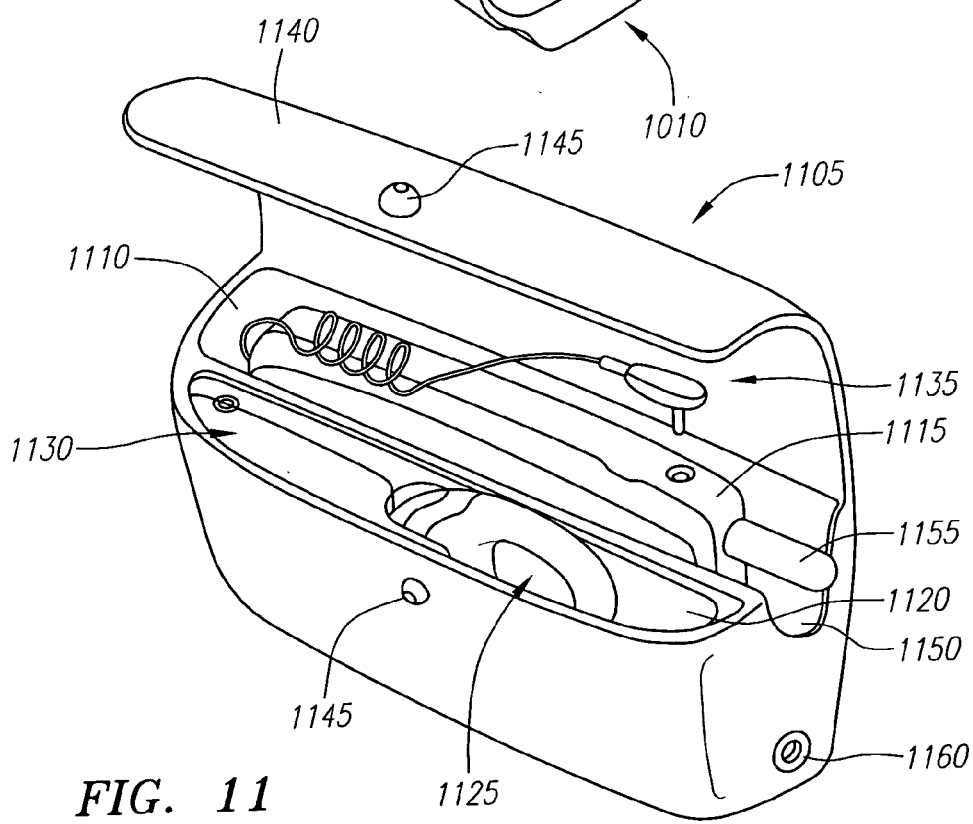
FIG. 11 illustrates an alternative carrying case with an integral dongle for holding a wireless headset and an external device.

FIG. 11 illustrates an alternative carrying case of the present invention. Carrying case 1105 includes compartment 1110 for external device 1115 and compartment 1120 for wireless headset 1125. Dongle 1130 is formed within carrying case 1105 and connects to external device 1115 via cord 1135. Flap 1140 may be opened and closed. In this embodiment, flap 1140 may be closed by securing snap 1145, but a variety of closing devices known in the art are used in other embodiments. Recessed portion 1150 provides an opening for antenna 1155 of external device 1115. Jack 1160 receives power for a battery charger (not shown) for recharging the batteries of external device 1115, wireless headset 1125 and/or dongle 1130.

Some embodiments of carrying case 1105 include a mounting device are similar to clip 1040 and are particularly suitable for attaching carrying case 1105 to an article of clothing. Other embodiments include alternative mounting devices such as those described above with reference to FIG. 10.

Figure 12:
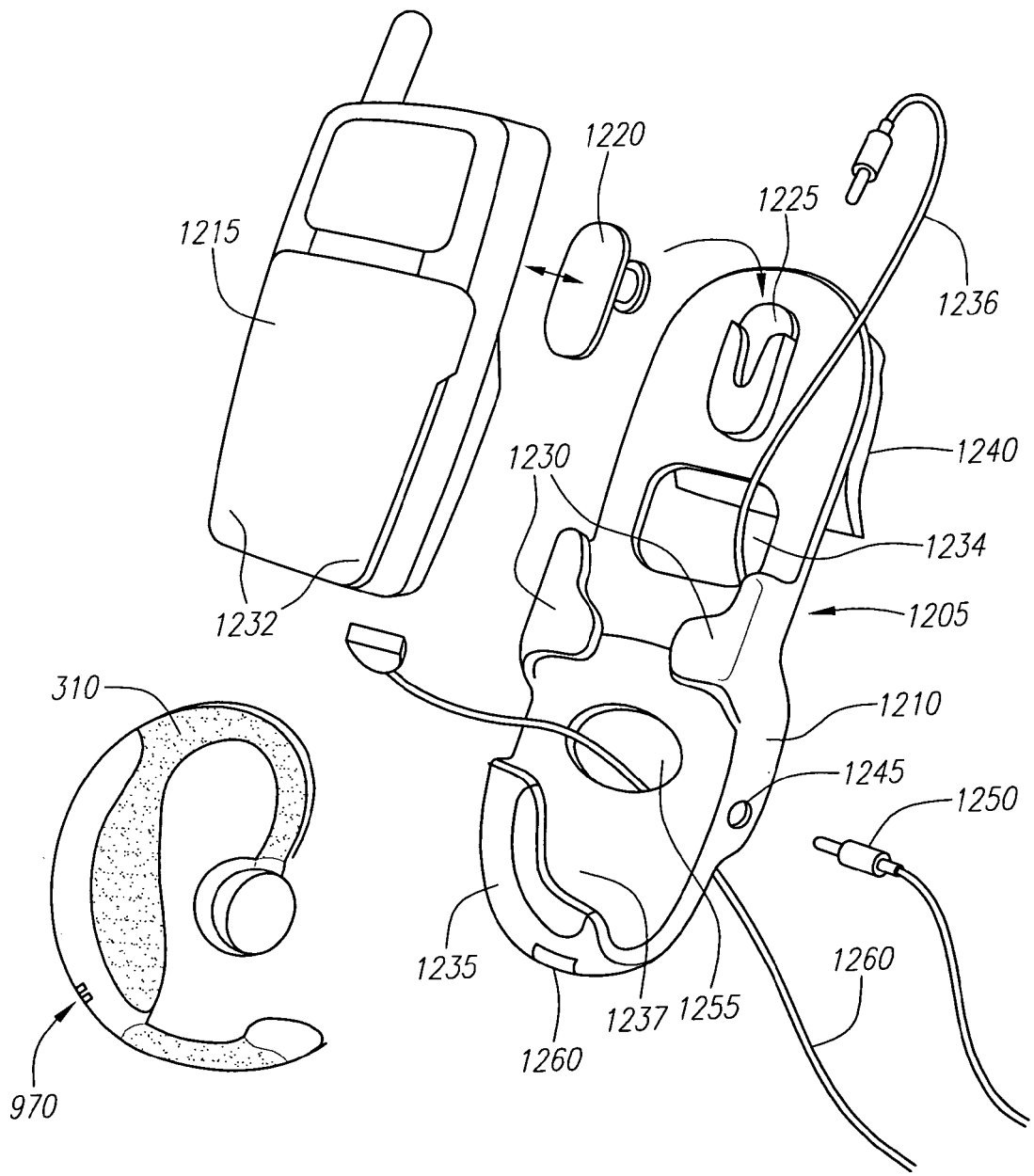
FIG. 12 is a perspective view of a carrying device with an integral dongle for holding a wireless headset and an external device.

FIG. 12 illustrates an embodiment of carrying device 1205 with integral dongle 1210. This embodiment of carrying device 1205 is configured to carry both external device 1215 and wireless headset 310. Attachment 1220 fits into a back portion of external device 1215 and into receiving portion 1225 of carrying device 1205, thereby attaching external device 1215 to carrying device 1205. Tabs 1230 are configured to hold corners 1232 of external device 1215, further securing external device 1215 to carrying device 1205. Port 1234 allows cord 1236 from integral dongle 1210 to connect with external device 1215.

Sleeve 1235 provides opening 1237 for insertion of wireless device 310. Preferably, wireless device 310 is held securely by sleeve 1235 after being inserted into opening 1237, such that contacts 970 of wireless device 310 are touching contacts 1260 (shown in phantom) of carrying device 1205.

Clip 1240 allows carrying device 1205 to be attached to a belt or to another article of a user's clothing. Other embodiments of carrying device 1205 use adhesive material, VELCRO™, a clamp, a loop, a suction cup, a strap or a similar device for attaching carrying device 1205 to a variety of surfaces.

Jack 1245 receives plug 1250 which supplies power to recharge the batteries of integral dongle 1210 and, when contacts 970 are touching contacts 1260, to recharge the batteries of wireless headset 310. In this embodiment, port 1255 allows cord 1260 to provide power to external device 1215. In other embodiments, carrying device has a jack which supplies power to wireless headset 310, integral dongle 1210 and external device 1215.

FIG. 13 is a front view of carrying device 1205 holding external device 1215 and wireless headset 310. Tabs 1230 are holding corners 1232 of external device 1215 and cord 1236 is plugged into external device 1215. Wireless device 310 is secured by sleeve 1235.

FIG. 13 is a front view of carrying device 1205 holding external device 1215 and wireless headset 310. Tabs 1230 are holding corners 1232 of external device 1215 and cord 1236 is plugged into external device 1215. Wireless device 310 is secure by sleeve 1235.

FIG. 14 is a side view of carrying device 1205 holding external device 1215 and wireless headset 310. In FIG. 14, clip 1240 and the location of integral dongle 1210 may more clearly be seen than in FIG. 12 or FIG. 13. In addition, FIG. 14 more clearly indicates how wireless device 310 is secured by sleeve 1235. Tab 1230 holds external device 1215. Cord 1236 is plugged into external device 1215.

FIG. 14 is a side view of carrying device 1205 holding external device 1215 and wireless headset 310. In FIG. 14, clip 1240 and the location of integral dongle 1210 may more clearly be seen than in FIG. 12 or FIG. 13. In addition, FIG. 14 more clearly indicates how wireless device 310 is secured by sleeve 1235. Tab 1230 holds external device 1215. Cord 1236 is plugged into external device 1215.

FIG. 14 is a side view of carrying device 1215 holding external device 1215 and wireless headset 310. In FIG. 14, clip 1240 and the location of integral dongle 1210 may more clearly be seen than in FIG. 12 or FIG. 13. In addition, FIG. 14 more clearly indicates how wireless device 310 is secured by sleeve 1235. Tab 1230 holds external device 1215. Cord 1236 is plugged into external device 1215.

While the best mode for practicing the invention has been described in detail, those of skill in the art will recognize that there are numerous alternative designs, embodiments, modifications and applied examples that are within the scope of the present invention. Accordingly, the scope of this invention is not limited to the previously described embodiments.

We claim:

1. An apparatus for use with a wireless headset comprising a first battery and a first electrical contact coupled to the first battery, the apparatus comprising:
   a housing configured for holding the headset;
   a transceiver disposed within the housing and configured for providing wireless communication between the headset and an external device;
   a second battery disposed within the housing and configured for supplying power to the transceiver;
   a second electrical contact carried by the housing and configured for coupling with the first electrical contact;
   a third electrical contact carried by the housing and configured for receiving power for recharging the first and second batteries; and
   a cord carried by the housing and configured for coupling the transceiver to the external device.

2. The apparatus of claim 1, further comprising a mounting device.

3. The apparatus of claim 1, wherein the external device is a telephone.

4. The apparatus of claim 1, wherein the external device is a personal digital assistant.

5. The apparatus of claim 1, wherein the external device is a computer.

6. The apparatus of claim 1, wherein the housing and the headset are configured for providing an interference fit with each other.

7. The apparatus of claim 6, wherein the interference fit is a snap-fit arrangement.

8. The apparatus of claim 1, wherein the housing comprises a recess configured for receiving the headset.

9. The apparatus of claim 1, wherein the transceiver is configured for wirelessly receiving signals from the headset and transmitting the received headset signals via the cord to the external device, and is configured for receiving signals via the cord from the external device and wirelessly transmitting the received external device signals to the headset.

10. The apparatus of claim 1, wherein the second electrical contact is configured for coupling with the first electrical contact when the housing interfaces with the headset.

11. The apparatus of claim 1, further comprising a recharger disposed within the housing and configured for receiving the power from the third electrical contact and recharging the first and second batteries.

12. The apparatus of claim 1, further comprising an external recharger configured for connecting to the third electrical contact.

13. The apparatus of claim 12, wherein the external recharger is configured for receiving the housing.

14. The apparatus of claim 1, wherein the third electrical contact comprises a jack.

15. The apparatus of claim 1, wherein the transceiver is integrated within the housing.

16. A holster for use with a wireless headset comprising a first battery and a first electrical contact coupled to the battery, the holster comprising:
   a housing;
   a transceiver disposed within the housing and configured for providing wireless communication between the headset and an external device;
   a second battery disposed within the housing and configured for supplying power to the transceiver;
   a cord carried by the housing and configured for coupling the transceiver to the external device;
   a pocket carried by the housing and configured for holding the headset;
   a user mounting device located on the housing;
   a second electrical contact carried by the housing and configured for coupling with the first electrical contact; and
   a third electrical contact carried by the housing and configured for receiving power for recharging the first and second batteries.

17. The holster of claim 16, wherein the external device is a telephone.

18. The holster of claim 16, wherein the external device is a personal digital assistant.

19. The holster of claim 16, wherein the external device is a computer.

20. The holster of claim 16, wherein the transceiver is configured for wirelessly receiving signals from the headset and transmitting the received headset signals via the cord to the external device, and is configured for receiving signals via the cord from the external device and wirelessly transmitting the received external device signals to the headset.

21. The holster of claim 16, wherein the second electrical contact is configured for coupling with the first electrical contact when the headset is placed in the pocket.

22. The holster of claim 16, further comprising a recharger disposed within the housing and configured for receiving the power from the third electrical contact and recharging the first and second batteries.

23. The holster of claim 16, further comprising an external recharger configured for connecting to the third electrical contact.

24. The holster of claim 23, wherein the external recharger is configured for receiving the housing.

25. The holster of claim 16, wherein the third electrical contact comprises a jack.

26. The holster of claim 16, wherein the transceiver is integrated within the housing.

27. A carrying device for use with a wireless headset comprising a first battery and an external device comprising a second battery, the carrying device comprising:
   a transceiver configured for providing wireless communication between the headset and external device;
   a third battery configured for supplying power to the transceiver;
   a first means for receiving the external device;
   a second means for receiving the headset; and an electrical contact configured for receiving power for recharging the first, second, and third batteries.

28. The carrying device of claim 27, wherein the first and second receiving means comprises compartments.

29. The carrying device of claim 27, wherein the first and second receiving means comprises pouches.

30. The carrying device of claim 27, wherein the second receiving means comprises a sleeve.

31. The carrying device of claim 27, further comprising a flap configured for enclosing the external device and headset.

32. The carrying device of claim 27, further comprising a cord configured for coupling the transceiver to the external device.

33. The carrying device of claim 27, further comprising a mounting device.

34. The carrying device of claim 27, wherein the external device is a telephone.

35. The carrying device of claim 27, wherein the external device is a personal digital assistant.

36. The carrying device of claim 27, wherein the external device is a computer.

37. The carrying device of claim 27, wherein the transceiver is configured for wirelessly receiving signals from the headset and transmitting the received headset signals via the cord to the external device, and is configured for receiving signals via the cord from the external device and wirelessly transmitting the received external device signals to the headset.

38. The carrying device of claim 27, wherein the headset comprises a first electrical contact, and the apparatus further comprises a second electrical contact configured for coupling with the first electrical contact when the first receiving means receives the headset.

39. The carrying device of claim 27, further comprising a recharger configured for receiving the power from the electrical contact and recharging the first, second and third batteries.

40. The carrying device of claim 27, wherein the third electrical contact comprises a jack.

\* \* \* \* \*